United States Patent [19]

Duclos et al.

[11] Patent Number: 4,601,445
[45] Date of Patent: Jul. 22, 1986

[54] DEVICE FOR RAPID FIXING AND REMOVAL OF A LOADER TO AND FROM AN AIRCRAFT CARRYING DEVICE

[75] Inventors: Didier A. Duclos, Maison Alfort; Pierre F. Coutin, Paris, both of France

[73] Assignee: R. Alkan & Cie, France

[21] Appl. No.: 686,820

[22] Filed: Dec. 27, 1984

[30] Foreign Application Priority Data

Jan. 10, 1984 [FR] France ................ 84 00267

[51] Int. Cl.⁴ .............................................. B64D 1/02
[52] U.S. Cl. ................................ 244/137 A; 89/1.59; 361/391; 361/415
[58] Field of Search .................. 244/137 R; 312/319, 312/333, 107.5, 216, 219; 89/34, 1.59, 1.51, 1.816, 1.8, 1.815; 361/391, 415, 339; 206/3; 211/60.1, 70.6, 4, 8

[56] References Cited

U.S. PATENT DOCUMENTS

| | | | |
|---|---|---|---|
| 2,514,246 | 7/1950 | Knox | 361/391 |
| 3,575,482 | 4/1971 | MacMaster | 361/391 |
| 3,576,515 | 4/1971 | Frantz | 361/391 |
| 3,893,740 | 7/1975 | England | 312/216 |
| 4,524,670 | 6/1985 | Billard et al. | 89/1.51 |

FOREIGN PATENT DOCUMENTS

| | | | |
|---|---|---|---|
| 546996 | 3/1932 | Fed. Rep. of Germany | 244/30 |
| 302187 | 12/1954 | Switzerland | 89/34 |
| 933215 | 5/1962 | United Kingdom | 361/391 |

Primary Examiner—Galen L. Barefoot
Assistant Examiner—Mark Valliere
Attorney, Agent, or Firm—William A. Drucker

[57] ABSTRACT

A device for rapidly positioning and removing a loader in and from a carrying device on an aircraft, comprising a lever in the form of a horse shoe or stirrup having a cross leg between two side legs which support the loader and which are pivotably mounted to the carrying device at their ends opposite the cross leg, whereas this latter carries a single screw for fixing to the carrying device, actuation of this lever being facilitated by previously automatically latching the loader to the bottom of the carrying device.

7 Claims, 8 Drawing Figures

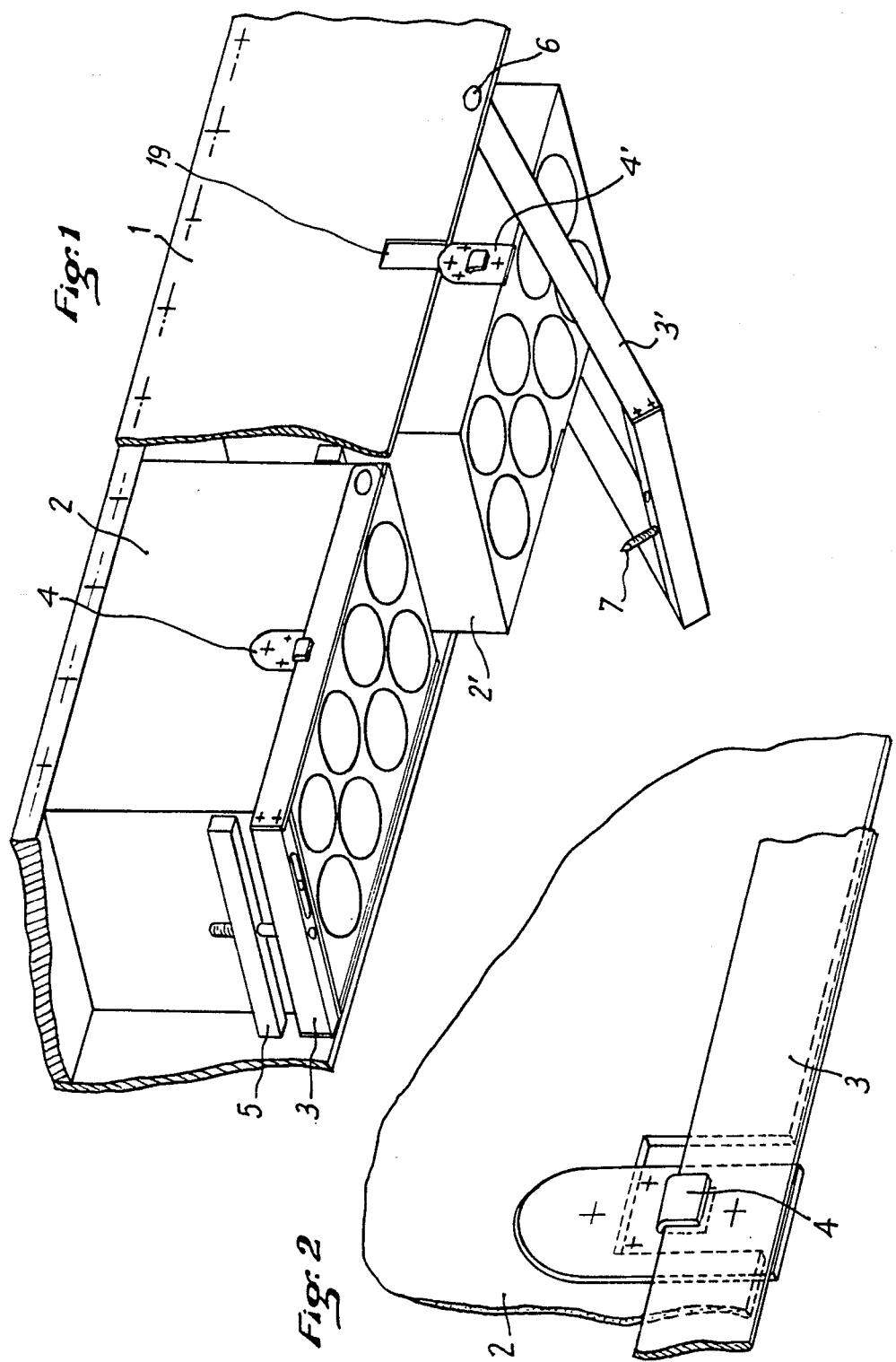

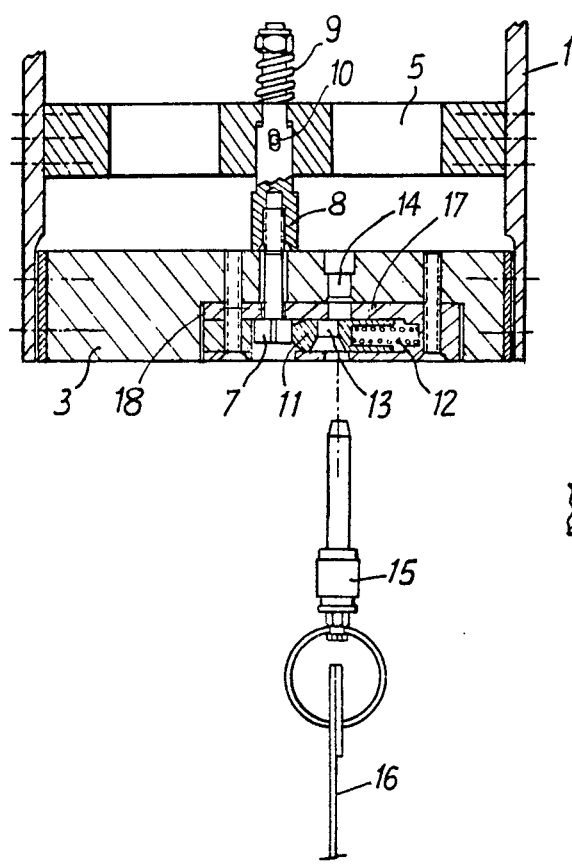
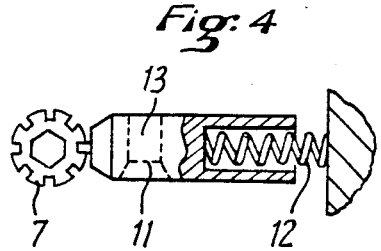
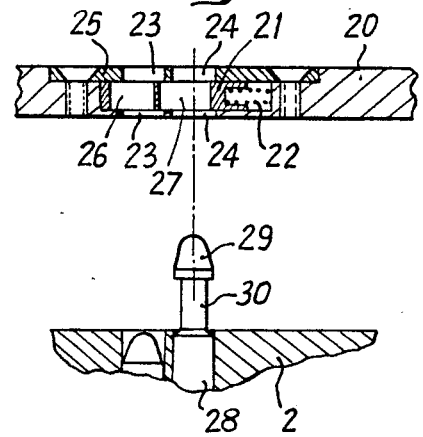
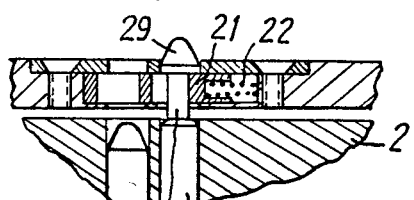
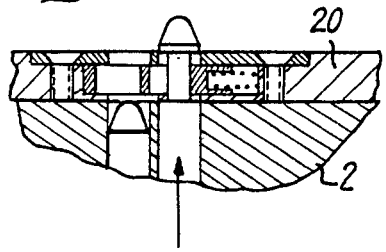
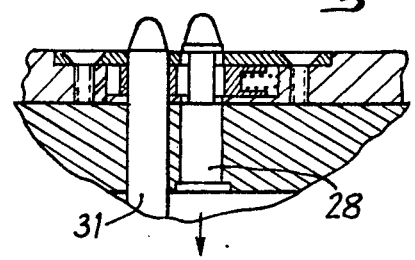

DEVICE FOR RAPID FIXING AND REMOVAL OF A LOADER TO AND FROM AN AIRCRAFT CARRYING DEVICE

BACKGROUND OF THE INVENTION

In the modular device for loading cartidges forming the subject of French patent application No. 83 19579 filed by the same company on the Dec. 7, 1983, fixing elements 17 are provided called bayonets and shown schematically in FIG. 5 of this application.

SUMMARY OF THE INVENTION

The present invention relates to a device for rapid fixing and removal of a loader to and from an aircraft carrying device applicable in particular to the cartridge loading module using the above bayonets. This device acts through an appropriate horse shoe or stirrup shaped lever used conjointly with a device for previous automatic latching of the module for facilitating handling.

The use of the lever provides, by means of a single screw, clean contact of the module with the carrying device under a given pressure, as well as uniform distribution of the stresses.

For safety's sake, a positive stop for the single screw has been provided. This positive stop is retracted, so as to allow actuation of the screw, by means of a pin (preferably of a retractable ball type) having a colored tag indicating its presence. During removal, the same pin may be used for overcoming the prior automatic latching which was effected during fixing.

BRIEF DESCRIPTION OF THE DRAWINGS

One embodiment of the device of the invention will be described hereafter with reference to the accompanying schematical drawings in which:

FIG. 1 shows a module in position and a module being fixed to the same carrying device;

FIG. 2 shows the detail for latching the lever in one of the bayonets of the module;

FIG. 3 is a cross section showing the lever brought into the top position by means of the fixing screw;

FIG. 4 is a partial view showing the system for stopping the fixing screw and the pin for releasing this stop;

FIG. 5 shows the automatic latching system and the module in approaching relation;

FIG. 6 shows the module in the prior latching position;

FIG. 7, similar to FIG. 6, shows the module completely in position; and

FIG. 8 shows the position of the latching parts after introduction of the pin which allows removal.

DESCRIPTION OF THE PREFERRED EMBODIMENT

In the schematical view shown in FIG. 1, the carrying device 1 secured to the aircraft is in partial section so as to better show the module 2 completely in position whereas at 2' a module has been shown which is incompletely introduced into the carrying device but already latched automatically as will be explained further on. For a better understanding of the role of the horse shoe or stirrup shaped lever 3—3', the projection of module 2' from the carrying device 1 after prior latching has been voluntarily exaggerated.

It will be readily understood that a carrying device such as 1 may comprise one or more module locations depending on the programs of use, each location being equipped with the device forming the subject of the present invention. Each horse shoe lever 3—3' comprises a transverse element between two lateral elements engageable in members 4—4' named bayonets which are in the form of hooks projecting from the sides of the corresponding module. Notches 19, formed in the walls of the carrying device, allow these projecting members to pass and the modules to be completely fitted into the carrier device.

Levers 3—' are pivotably mounted at 6 to the carrying device and their transverse element joining together the two lateral elements at the opposite end to pivots 6 comprises a central screw 7 intended for fixing same to a cross piece 5 integral with the carrying device 1.

FIG. 2 is an enlarged view showing the engagement of one of the side elements of lever 3 in bayonet 4 fixed to module 2.

FIG. 3 is a cross sectional view of the device where we find again the transverse element of the horse shoe shaped lever 3 and the cross piece 5 integral with the carrying device 1. In this cross piece 5 slides a part with internal thread 8 urged upwards by a calibrated spring 9. For ease of manufacture, this part 8 is preferably cylindrical and rotation thereof is prevented by a known system, for example by means of a fixed pin 10 and a corresponding vertical oblong slit formed in the sliding part for receiving the fixed pin. Screw 7, preferably of the kind with hexagonal hollow head for forming outer indentations on said head as is shown in FIG. 4, is screwed into the tapped part 8 until the base of this part 8 comes into contact with the transverse element of lever 3 as is shown in FIG. 3.

The prestress between module 2 and the carrying device 1 is then defined solely by the tension of the calibrated spring 9. It should be understood that this prestress is exerted by lever 3 on the lateral bayonets 4 situated in the middle of the length of the module and that thus the forces acting on the bottom of the carrying device, limited by spring 9, are in addition uniformly distributed.

As was mentioned above, for safety's sake provision is made for positively locking the single fixing screw 7. This locking (FIG. 4) is provided by means of a sliding finger 11 which is urged by a spring 12 and whose end engages in one of the indentations provided on the outside of the head of screw 7. In order to be able to use screw 7 during clamping or removal, a retracted position of the sliding finger 11 has been provided which is obtained by bringing the cylindrical hole 13 formed in finger 11 and the cylindrical hole 14 (FIG. 3) formed in the transverse element of stirrup 3 into coincidence. For this, a retractable ball pin 15 of a known pattern is used which, after being introduced in hole 13 then into hole 14 remains in position. The presence of this pin 15 is indicated by a colored tag 16. For ease of production, finger 11 is preferably cylindrical and, to prevent rotation thereof, a fixed stud 17 penetrates into a corresponding oblong slit formed longitudinally in the sliding finger 11. Screw 7 is made so that it cannot be lost by a known process which consists in providing part 18 of stirrup 3 with an internal screw thread.

In FIG. 5, at 20 is shown the bottom of the carrying device 1 in which a bolt 21 is provided which is pushed leftwards in the Figure by a spring 22. Cylindrical holes of equal diameter 23 and 24 are provided in bottom 20 and in plate 25 holding bolt 21 in position whereas equivalent holes 26 and 27 are provided in the bolt 21.

Module 2 comprises a cylindrical shaft 28 with ogival head 29 under which a reduced cylindrical part 30 is provided.

FIG. 6 shows module 2 in the prior latching position. The ogival head 29 of shaft 28, after pushing bolt 21 against spring 22, bears on this bolt 21 which slides leftwards of the Figure as soon as the reduced part of shaft 28 allows it. It will be noted that the elements for this prior latching are designed so as to be adapted to a bottom 20 of small thickness.

FIG. 7 only differs from FIG. 6 by the complete introduction of module 2 brought into contact with bottom 20 of the carrying device 1 by tightening screw 7.

FIG. 8 shows the unlocking of shaft 28 obtained by fitting a pin 31 into the hole 23 in bottom 20 and hole 26 in bolt 21, which ensures coincidence of the axes and in particular alignment of the holes 24 in the bottom and 27 in the bolt for allowing shaft 28 to be withdrawn.

Use of the device is clear from the preceding description. For positioning a loader 2, it is introduced into the carrying device 1 until shaft 28 is snap fitted which occurs automatically as has been mentioned. This prior snap fitting allows lever 13 to be raised without difficulty by causing it to pivot about pins 6. The two lateral legs of this lever are engaged in the side latching members 4 called bayonets, fixed on each side of the center of gravity of loader 6, and the single screw 7 is lined up with the internally tapped part 8 integral with cross piece 5 of the carrying device 1.

Screwing in of screw 7 is effected after retraction of the sliding finger 11 obtained by engagement of the ball pin 15 in hole 13 of finger 11 and in hole 14 of the cross leg of lever 3. This screwing in which results in completing the fitting of loader 2 into the carrying device 1 brings part 8 into contact with the cross leg of lever 3. Then the ball pin 15 is withdrawn so as free finger 11 whose end may be inserted in one of the indentations formed on the outside of the head of screw 7, thus preventing accidental unscrewing of this screw.

Spring 9, initially calibrated, limits the force required for holding loader 2 in the carrying device 1 to a suitable value. This force is transmitted to the loader 2 at the level of latching pieces 4 through side legs of lever 3 which are engaged therewith as already indicated.

Removal also takes place in two steps and in the reverse order by replacing the ball pin 15. With lever 3 brought into the complete release position, loader 2 remains suspended by the automatic latching. The use of pin 31 brings the latching part into the position shown in FIG. 8, which allows complete removal of loader 2.

The rapid positioning and removal device thus described may be applied not only to the positioning of a loader in a cartridge launcher, which use has been given by way of example, but also to all similar cases without connection with carrying cartridges.

What we claim is:

1. A device for rapid positioning and removal of a loader in and from an aircraft carrying device, which comprises:
   a horse shoe shaped lever consisting of:
     a pair of parallel side legs adapted to support the loader and which are pivotably mounted at one end on the carrying device,
     a cross leg interconnecting said side legs at their opposite ends,
   a single fixing screw carried by said cross leg and adapted to co-act with the carrying device for ensuring a final securing of the loader, and
   means carried by said loader and adapted to co-act with a flat bolt housed in the thickness of the bottom of the carrying device for ensuring an automatic previous latching of the loader to the carrying device.

2. The device as claimed in claim 1, wherein said flat bolt comprises two holes and slides in the thickness of the bottom of the carrying device between two endmost positions comprising a first position towards which it is urged by a spring and in which said two holes are not opposite corresponding holes formed in the bottom of the carrying device, and a second position in which coincidence of the bolt holes and the bottom holes is obtained.

3. The device as claimed in claim 2, wherein said means carried by the loader for ensuring the latching thereof to the carrying device comprise a latching shaft integral with the loader and adapted to pass through a hole formed in the bottom of the carrying device and an opposite hole of said flat bolt in the second position thereof.

4. The device as claimed in claim 3 wherein, for removing said latching shaft from the opposite holes of the bottom of the carrying device and of the flat bolt, an auxiliary pin is engaged into another hole in the flat bolt and an opposite hole in the bottom.

5. The device as claimed in claim 1, wherein a stop limits the travel of the fixing screw so that a single calibrated spring provides a limited prestress between the loader and the carrying device.

6. The device as claimed in claim 1, wherein said horse shoe shaped lever acts through its side legs on the loader on each side of the center of gravity of the loader, thus uniformly distributing the stress defined by said calibrated spring between the loader and the bottom of the carrying device.

7. The device as claimed in claim 1, wherein the single fixing screw is positively locked by a spring loaded finger sliding within said cross leg and being engaged in indentations in the head of the screw, said finger taking a retracted position, allowing actuation of the screw, by fitting a pin into a hole in the finger.

* * * * *